(12) United States Patent
Hara et al.

(10) Patent No.: US 6,613,440 B2
(45) Date of Patent: Sep. 2, 2003

(54) ADDITION REACTION CURING TYPE SILICONE RUBBER COMPOSITION AND MAKING METHOD

(75) Inventors: Hiroyasu Hara, Gunma-ken (JP); Hideki Sugahara, Gunma-ken (JP); Yoshifumi Inoue, Gunma-ken (JP); Takashi Aketa, Gunma-ken (JP)

(73) Assignee: Shin-Etsy Cgenucak Ci, M Ktd, Tokyo (JP)

( * ) Notice: Subject to any disclaimer, the term of this patent is extended or adjusted under 35 U.S.C. 154(b) by 0 days.

(21) Appl. No.: 09/905,979

(22) Filed: Jul. 17, 2001

(65) Prior Publication Data

US 2002/0037963 A1 Mar. 28, 2002

(30) Foreign Application Priority Data

Jul. 19, 2000 (JP) ........................ 2000-219502

(51) Int. Cl.$^7$ ............................................... B32B 25/20
(52) U.S. Cl. .................. 428/447; 523/200; 528/12; 528/15; 528/31; 528/32; 525/478; 524/588; 524/425; 524/500; 701/1
(58) Field of Search ............................. 523/200; 528/12, 528/15, 31, 32; 525/478; 524/588, 425, 500; 701/1

(56) References Cited

U.S. PATENT DOCUMENTS

| 4,102,852 A | * | 7/1978 | DeLaTorre et al. |
| 5,283,307 A | * | 2/1994 | Larson |
| 6,043,309 A | | 3/2000 | Nakamura et al. |

FOREIGN PATENT DOCUMENTS

| EP | 1 106 654 A2 | 6/2001 |
| JP | 10-060281 | 6/1998 |

* cited by examiner

Primary Examiner—Robert Dawson
Assistant Examiner—Kuo-Liang Peng
(74) Attorney, Agent, or Firm—Birch, Stewart, Kolasch & Birch, LLP

(57) ABSTRACT

An addition reaction curing type silicone rubber composition comprising (A) an alkenyl-containing diorganopolysiloxane, (B) an alkaline earth metal carbonate powder surface treated with a diorganopolysiloxane, (C) an organohydrogenpolysiloxane, and (D) a platinum group metal catalyst has improved storage stability in that it gives off little or no hydrogen gas during storage. The composition has improved adhesion and a good ability to protect electric or electronic parts from corrosion and finds typical use in the sealing of electric or electronic parts.

17 Claims, No Drawings

ADDITION REACTION CURING TYPE SILICONE RUBBER COMPOSITION AND MAKING METHOD

This invention relates to a silicone rubber composition of the addition reaction curing type loaded with alkaline earth metal carbonate powder and a method for preparing the same.

BACKGROUND OF THE INVENTION

In the prior art, alkaline earth metal carbonate powder is used in combination with rubbers for the purposes of improving the heat resistance and electrical insulation of silicone rubber and the acid resistance of cured rubber. Most often, the alkaline earth metal carbonate powder is used in millable silicone rubber compositions relying on organic peroxide crosslinking and RTV silicone rubber compositions relying on condensation crosslinking. However, it is not used in silicone rubber compositions relying on addition reaction crosslinking. The reason is that customary alkaline earth metal carbonate powder used as a filler is alkaline and can react with an organohydrogenpolysiloxane contained as the crosslinking agent in silicone rubber compositions of the addition reaction curing type, giving off hydrogen gas. The evolution of hydrogen gas causes the composition to foam during shelf storage or boosts the internal pressure of a container having the composition received therein, with the danger of eventual rupture of the container.

On the other hand, the addition reaction curing type silicone rubber compositions have many advantages over the condensation type RTV silicone rubber compositions. The former do not require a long time for curing as do the latter. The latter suffers from the reversion that a polysiloxane contained therein undergoes cleavage at elevated temperature under sealed conditions, whereas the former does not give rise to the reversion. Therefore, there is a need for an addition reaction curing type silicone rubber composition loaded with alkaline earth metal carbonate powder.

In particular, there is a need for an addition reaction curing type silicone rubber composition loaded with alkaline earth metal carbonate powder for the purpose of improving adhesion when used as an adhesive, which composition remains stable during storage.

SUMMARY OF THE INVENTION

Therefore, an object of the invention is to provide an addition reaction curing type silicone rubber composition loaded with alkaline earth metal carbonate powder, which composition has improved storage stability in that it gives off a minimized amount of hydrogen gas during storage. Another object is to provide a method for preparing the same composition.

It has been found that an addition reaction curing type silicone rubber composition having improved storage stability is obtainable using an alkaline earth metal carbonate which has been surface treated substantially with a diorganopolysiloxane. When the resulting silicone rubber composition is used in conjunction with electric and electronic parts for the purpose of providing a seal around the parts, the rubber is also effective for preventing the parts from corrosion by air-borne corrosive gases. This offers a useful means for overcoming the corrosion problem of electric and electronic parts with automotive emissions such as NOx and SOx. The invention is predicated on this finding.

In one aspect, the invention provides an addition reaction curing type silicone rubber composition comprising (A) a diorganopolysiloxane containing at least two alkenyl groups in a molecule, (B) an alkaline earth metal carbonate powder surface treated substantially with a diorganopolysiloxane, (C) an organohydrogenpolysiloxane containing at least two hydrogen atoms each attached to a silicon atom in a molecule, and (D) a platinum group metal catalyst.

In another aspect, the invention provides a method for preparing a silicone rubber composition of the addition reaction curing type, comprising the steps of mixing a portion or all of a diorganopolysiloxane containing at least two alkenyl groups in a molecule with an alkaline earth metal carbonate at an elevated temperature for surface treating the alkaline earth metal carbonate; mixing the mixture with the remainder of the diorganopolysiloxane if the portion thereof is used in the first mixing step; and mixing the mixture with an organohydrogenpolysiloxane containing at least two hydrogen atoms each attached to a silicon atom in a molecule and a platinum group metal catalyst.

DESCRIPTION OF THE PREFERRED EMBODIMENTS (A) Alkenyl-Containing Diorganopolysiloxane The alkenyl-containing diorganopolysiloxane used as a base polymer in the inventive composition is a diorganopolysiloxane containing at least two alkenyl groups in a molecule. Preferably it has the average compositional formula (1):

$$R_a SiO_{(4-a)} \qquad (1)$$

wherein R, which may be the same or different, is a substituted or unsubstituted monovalent hydrocarbon group of 1 to 12 carbon atoms, preferably 1 to 10 carbon atoms, more preferably 1 to 6 carbon atoms, and "a" is a positive number of 1.5 to 2.8, preferably 1.8 to 2.5, and more preferably 1.95 to 2.05.

Examples of the substituted or unsubstituted monovalent hydrocarbon groups attached to silicon atoms, represented by R, include alkyl groups such as methyl, ethyl, propyl, isopropyl, butyl, isobutyl, tert-butyl, pentyl, neopentyl, hexyl, heptyl, octyl, nonyl, decyl and dodecyl; cycloalkyl groups such as cyclopentyl, cyclohexyl and cycloheptyl; aryl groups such as phenyl, tolyl, xylyl, naphthyl and biphenyl; aralkyl groups such as benzyl, phenylethyl, phenylpropyl and methylbenzyl; alkenyl groups such as vinyl, allyl, propenyl, isopropenyl, butenyl, hexenyl and cyclohexenyl; and substituted ones of the foregoing groups in which some or all of the hydrogen atoms are replaced by halogen atoms (e.g., fluoro, bromo and chloro), cyano groups or the like, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl.

Of these, preferred are substituted or unsubstituted alkyl groups of 1 to 3 carbon atoms such as methyl, ethyl, propyl, chloromethyl, bromoethyl, 3,3,3-trifluoropropyl, and cyanoethyl, and substituted or unsubstituted phenyl groups such as phenyl, chlorophenyl and fluorophenyl. Of the alkenyl groups, lower alkenyl groups such as vinyl and allyl are preferred.

At least two of the R groups must be alkenyl groups, preferably of 2 to 8 carbon atoms, more preferably 2 to 6 carbon atoms. It is noted that the content of alkenyl groups is preferably 0.001 to 20 mol %, especially 0.01 to 10 mol % based on the entire organic groups attached to silicon atoms (that is, the substituted or unsubstituted monovalent hydrocarbon groups included as R in average compositional formula (1)). The alkenyl groups may be attached to silicon atoms at ends of the molecular chain and/or silicon atoms midway the molecular chain. When the cure rate of the composition and the physical properties of cured products are taken into account, the organopolysiloxane should preferably have at least alkenyl groups attached to the silicon atoms at molecular chain ends.

With respect to the structure, the organopolysiloxane is generally a linear diorganopolysiloxane whose backbone is comprised of recurring diorganosiloxane units and which is blocked with a triorganosiloxy group at either end of the molecular chain. However, it may have a partially branched or cyclic structure. A linear diorganopolysiloxane is preferred from the standpoint of the mechanical strength and other physical properties of cured products. The alkenyl-containing diorganopolysiloxane preferably has a viscosity of about 10 to 1,000,000 centistokes (cSt) at 25° C., and more preferably about 100 to 500,000 cSt at 25° C.

One preferred, non-limiting, class of alkenyl-containing diorganopolysiloxanes includes those of the following general formula.

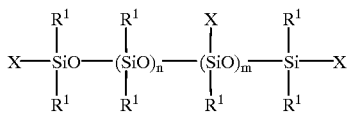

Herein, $R^1$ is independently a substituted or unsubstituted monovalent hydrocarbon group free of aliphatic unsaturation, examples of which are the same as exemplified above for R except the alkenyl groups. X is an alkenyl group, examples of which are the same as exemplified above. Letter n is 0 or an integer of at least 1, m is 0 or an integer of at least 1, preferably satisfying $10 \leq n+m \leq 10,000$, more preferably $50 \leq n+m \leq 2,000$ and $0 \leq m/(n+m) \leq 0.2$.

(B) Alkaline Earth Metal Carbonate Powder

The alkaline earth metal carbonate powder used herein is originally a basic one such as calcium carbonate and magnesium carbonate. The alkaline earth metal carbonate powder should have been surface treated substantially with a diorganopolysiloxane.

The alkaline earth metal carbonate powder is typically selected from calcium carbonate and magnesium carbonate. Of these, calcium carbonate is readily available and suitable on commercial use. The calcium carbonate powder used herein may be selected from well-known species such as heavy, precipitated and colloidal ones. Since those calcium carbonate powders which have been surface treated with resin acids alone or in admixture can alter the organohydrogen-polysiloxane (C), originally untreated calcium carbonate powders are preferred. The alkaline earth metal carbonate powder including secondary agglomerates preferably has an average particle size of 0.05 to 50 μm, more preferably 0.5 to 30 μm when the flow and reinforcement of silicone rubber compositions loaded therewith are taken into consideration. The average particle size as used herein may be determined, for example, as a weight-average value (median size) by laser light diffraction.

The diorganopolysiloxane used for the surface treatment of alkaline earth metal carbonate powder may be substantially a linear organopolysiloxane having diorganosiloxane units as a main chain and blocked with silanol groups (i.e., hydroxy groups bonded to silicon atoms) or triorganosiloxy groups such as trimethylsiloxy groups and vinyldimethylsiloxy groups at both ends of the molecular chain, and may be selected from nonfunctional diorganopolysiloxanes (not containing a reactive functional group such as alkenyl in a molecule) such as dimethylpolysiloxane and methylphenylpolysiloxane, and diorganopolysiloxanes containing alkenyl groups in a molecule. The diorganopolysiloxane having a viscosity of about 10 to 1,000,000 cSt, especially about 100 to 500,000 cSt at 25° C. is preferably used. In a preferred embodiment, the same alkenyl-containing diorganopolysiloxane as described above for component (A) is used. In this embodiment, the alkaline earth metal carbonate powder is previously surface treated with a portion of component (A) and the resulting mixture is admixed with the remainder of component (A) and other components. Alternatively, the alkaline earth metal carbonate powder is mixed with the entirety of component (A) to effect surface treatment with component (A). Typical surface treating means is by heating a mixture of the dimethylpolysiloxane and the alkaline earth metal carbonate powder at an elevated temperature. The elevated temperature is about 50° C. or higher, preferably about 80 to 200° C. Heat treatment may be effected under atmospheric pressure (1 atm.) although a vacuum may be used to promote the heat treatment. The vacuum is not critical as long as it is lower than 760 mmHg. Often heat treatment is effected under a vacuum of about 1 to 250 mmHg, preferably about 5 to 100 mmHg. The treating time is preferably about 10 to 600 minutes, and especially about 30 to 180 minutes. Since the treatment with dimethylpolysiloxane causes the alkaline earth metal carbonate powder to release moisture that it has borne, the alkaline earth metal carbonate powder can be blended in an addition reaction curing type silicone rubber composition without the risk of altering the organohydrogenpolysiloxane (C). The resulting addition reaction curing type silicone rubber composition is fully stable.

An appropriate amount of the alkaline earth metal carbonate powder (B) blended is about 1 to 100 parts, especially about 3 to 50 parts by weight per 100 parts by weight of component (A) (inclusive of the portion of component (A) used for the surface treatment of component (B)). Too less an amount of component (B) may result in a composition which is inferior in adhesion and barrier seal against corrosive gases. Too much an amount of component (B) may result in a failure to provide cured silicone rubber having stable rubber elasticity. (C) Organohydrogenpolysiloxane The organohydrogenpolysiloxane used herein serves as a crosslinking agent and may be selected from linear, branched and cyclic ones and three-dimensional network resinous ones as long as it contains at least two, preferably at least three silicon atom-bound hydrogen atoms (i.e., SiH groups). Typical organohydrogenpolysiloxanes have the following average compositional formula (2).

$$H_b R^2_c SiO_{(4-b-c)/2} \qquad (2)$$

Herein, $R^2$ is independently a substituted or unsubstituted monovalent hydrocarbon group free of aliphatic unsaturation, b and c are numbers in the range of $0<b<2.0$, $0.8 \leq c \leq 2$ and $0.8<b+c \leq 3$, and preferably $0.01 \leq b \leq 1$, $1.5 \leq c \leq 2$ and $1.8 \leq b+c \leq 2.7$.

Examples of the substituted or unsubstituted monovalent hydrocarbon group free of aliphatic unsaturation, represented by $R^2$, are the same as exemplified for R in average compositional formula (1). Typical hydrocarbon groups are those having 1 to 10 carbon atoms, especially 1 to 7 carbon atoms, preferably lower alkyl groups of 1 to 3 carbon atoms such as methyl, phenyl and 3,3,3-trifluoropropyl.

Exemplary organohydrogenpolysiloxanes include siloxane oligomers such as 1,1,3,3-tetramethyldisiloxane, 1,3,5,7-tetramethyltetracyclosiloxane and 1,3,5,7,8-pentamethylpentacyclosiloxane; both end trimethylsiloxy-blocked methylhydrogenpolysiloxane, both end trimethylsiloxy-blocked dimethylsiloxane-methylhydrogensiloxane copolymers, both end silanol-blocked methylhydrogenpolysiloxane, both end silanol-blocked dimethylsiloxane-methylhydrogensiloxane copolymers, both end dimethylhydrogensiloxy-blocked dimethylpolysiloxane, both end dimethylhydrogensiloxy-blocked methylhydrogenpolysiloxane, both end dimethylhydrogensiloxy-blocked dimethylsiloxane-methylhydrogensiloxane copolymers, both end trimethylsiloxy-blocked dimethylsiloxane-diphenylsiloxane-methylhydrogensiloxane copolymers, and both end dimethylhydrogensiloxy-blocked dimethylsiloxane-diphenylsiloxane-methylhydrogensiloxane copolymers, as well as silicone resins comprising $R^2{}_2(H)SiO_{1/2}$ units and $SiO_{4/2}$ units which optionally contain $R^2{}_3SiO_{1/2}$ units, $R^2{}_2SiO_{2/2}$ units, $R^2(H)SiO_{2/2}$ units, $(H)SiO_{3/2}$ units or $R^2SiO_{3/2}$ units wherein $R^2$ is a substituted or unsubstituted monovalent hydrocarbon group as defined above. Also included are organohydrogenpolysiloxanes of the following formulae.

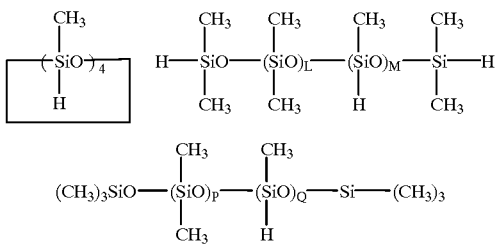

Herein L is an integer of 1 to 200, M is an integer of 0 to 300, L+M is an integer of 1 to 300, P is an integer of 1 to 200, Q is an integer of 2 to 300, and P+Q is an integer of 2 to 300.

It is noted that the organohydrogenpolysiloxane may have a degree of polymerization (number of silicon atoms per molecule) in the range of about 2 to about 300, desirably about 4 to about 200, and a viscosity of about 0.1 to 1,000 cSt at 25° C., desirably about 0.5 to 500 cSt at 25° C.

The organohydrogenpolysiloxane used herein may be prepared by well-known methods, for example, by subjecting to (co)hydrolysis at least one chlorosilane selected from the following formulae:

$R^2SiHCl_2$ and $R^2{}_2SiHCl$ wherein $R^2$ is as defined above, or by subjecting to cohydrolysis a combination of the chlorosilane with at least one chlorosilane selected from the following formulae:

$R^2{}_3SiCl$ and $R^2{}_2SiCl_2$ wherein $R^2$ is as defined above. If desired, the polysiloxanes resulting from such cohydrolysis is further subjected to equilibration reaction, resulting in an organohydrogenpolysiloxane which is also useful.

The organohydrogenpolysiloxane (C) is preferably used in such amounts that 0.5 to 4 mol, especially 1 to 2.5 mol of silicon atom-bound hydrogen atoms (i.e., SiH groups) in the organohydrogenpolysiloxane (C) are available per mol of alkenyl groups in the alkenyl-containing diorganopolysiloxane (A).

(D) Platinum Group Metal Catalyst

The platinum group metal catalyst used herein is a catalyst for promoting addition reaction between silicon atom-bound alkenyl groups in component (A) and silicon atom-bound hydrogen atoms in component (B). Well-known catalysts used in hydrosilylation reaction are useful. Exemplary catalysts are platinum, palladium and rhodium base catalysts including elemental platinum group metals such as platinum (inclusive of platinum black), rhodium and palladium: platinum chloride, chloroplatinic acid and chloroplatinates such as $H_2PtCl_4 \cdot nH_2O$, $H_2PtCl_6 \cdot nH_2O$, $NaHPtCl_6 \cdot nH_2O$, $KHPtCl_6nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$ wherein n is an integer of 0 to 6, preferably 0 or 6; alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals such as platinum black and palladium on carriers such as alumina, silica and carbon; rhodium-olefin complexes; chlorotris(triphenylphosphine)rhodium (Wilkinson catalyst); and complexes of platinum chloride, chloroplatinic acid or chloroplatinates with vinyl-containing siloxanes, especially vinyl-containing cyclic siloxanes.

The catalyst (D) is used in a catalytic amount, typically about 0.1 to 1,000 parts, preferably about 0.2 to 500 parts, and more preferably about 0.5 to 200 parts by weight of platinum group metal per million parts by weight of components (A) and (C) combined.

(E) Adhesive Agent

The adhesive agent or adhesiveness-imparting component (E) is optionally blended in the inventive composition.

In a preferred embodiment, the adhesive agent (E) is selected from organic compounds or organosilicon compounds containing in a molecule at least one group selected from among Si—H (i.e., silicon atom-bound hydrogen atom), alkenyl, acrylic, methacrylic, epoxy, alkoxysilyl, ester, carboxy anhydride, amino and amide groups, or a mixture thereof. The preferred adhesive agents are organosilicon compounds, typically linear or cyclic organosiloxane oligomers and organoalkoxysilanes of about 1 to 30 silicon atoms, preferably about 2 to 20 silicon atoms, and more preferably about 4 to 10 silicon atoms, having in a molecule at least one, often 1 to 10, especially 2 to 6, Si—H groups (i.e., silicon atom-bound hydrogen atoms) and/or alkenyl groups as well as one or more groups selected from among epoxy groups (e.g. glycidoxy), alkoxysilyl groups (e.g., trimethoxysilyl, triethoxysilyl and methyldimethoxysilyl), acrylic, methacrylic, ester, carboxy anhydride, amino, and amide groups.

More illustratively, suitable compounds containing epoxy, alkoxysilyl, ester, alkenyl, amino, carboxy anhydride, acrylic, and methacrylic groups include non-silicon organic compounds having alkenyl and epoxy groups such as allyl glycidyl ether; and organoalkoxysilanes, for example, epoxy functional group-containing alkoxysilanes such as γ-glycidoxypropyltrimethoxysilane and β-(3,4-epoxycyclohexyl)ethyltrimethoxysilane; alkenyl group-containing alkoxysilanes such as vinyltrimethoxysilane, vinyltriethoxysilane and vinyltri(methoxyethoxy)silane; amino group-containing alkoxysilanes such as β-aminopropyltrimethoxysilane, γ-aminopropyltriethoxysilane, N-γ-(aminoethyl)-γ-aminopropyltrimethoxysilane, N-β-(aminoethyl)-γ-aminopropylmethyldimethoxysilane, and N-phenyl-γ-aminopropyltrimethoxysilane; and acrylic or methacrylic group-containing alkoxysilanes such as γ-methacryloxypropyltrimethoxysilane and γ-acryloxypropyltrimethoxysilane. Other useful compounds are organosiloxane oligomers which are shown below.

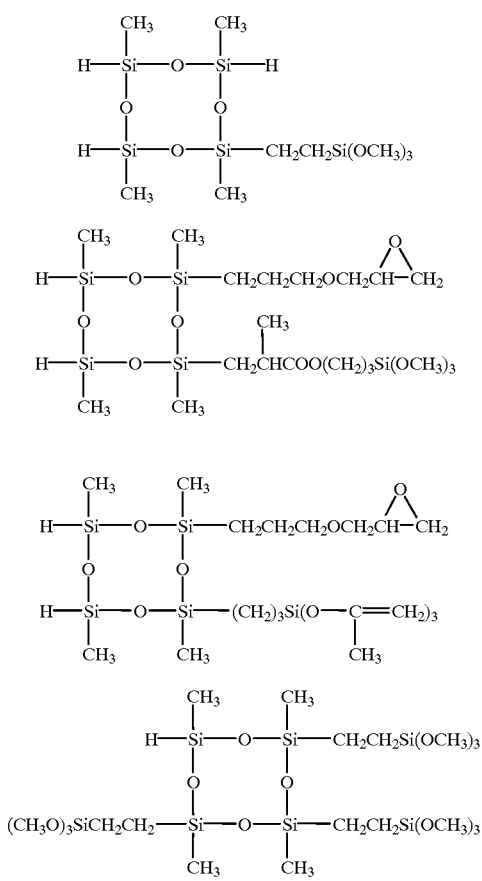
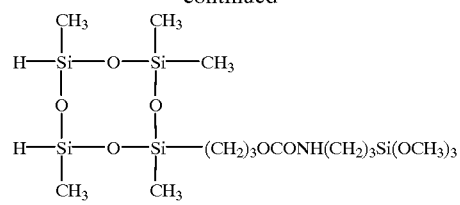
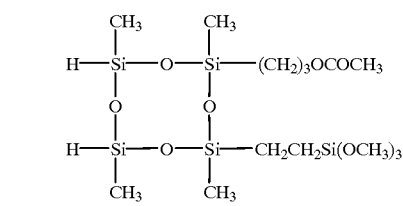
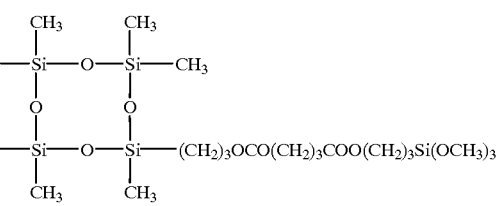

The foregoing silicon compounds containing epoxy, alkoxy and carboxy anhydride groups effectively bond with metals and organic resins.

As the compound which effectively bonds with thermoplastic resins or compositions comprising the same, but not easily with metals, use may be made of organosilicon compounds including linear, branched or cyclic organosiloxane oligomers of about 1 to 30 silicon atoms, preferably about 2 to 20 silicon atoms, and especially about 4 to 12 silicon atoms, containing at least one, preferably about 1 to 20, and more preferably about 3 to 10, Si—H groups in a molecule and having a mono- to trivalent phenyl or phenylene skeleton not directly bound to a silicon atom. These compounds are exemplified below. Among others, those compounds having two or more phenyl or phenylene skeletons are especially preferred.

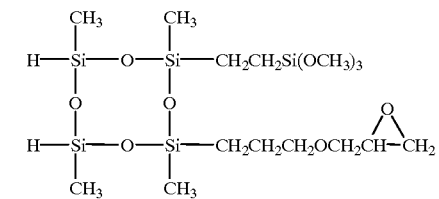
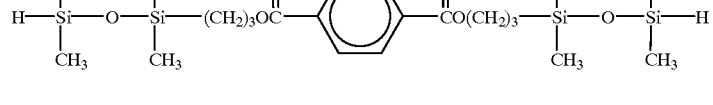
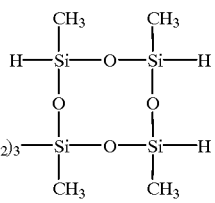
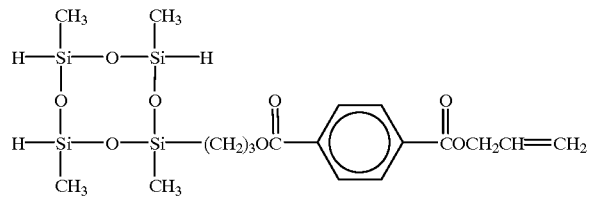

-continued
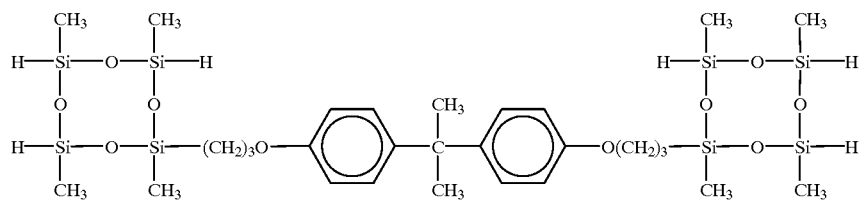
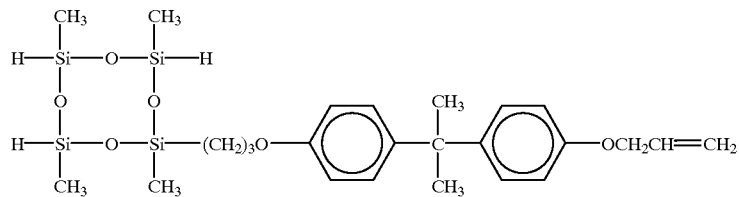
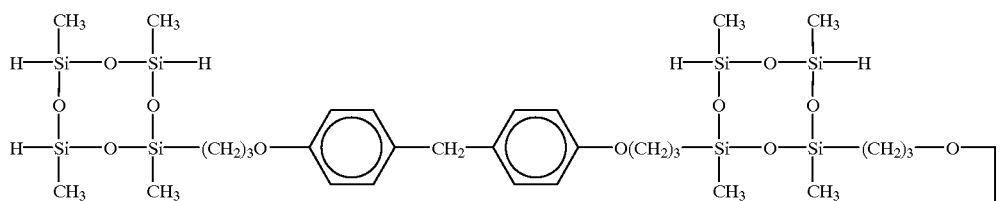
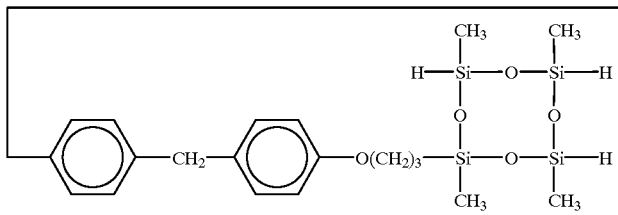
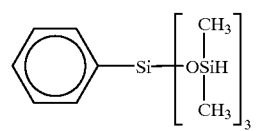 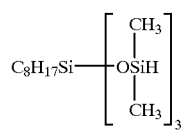 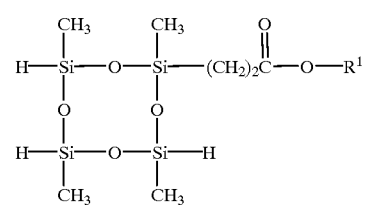
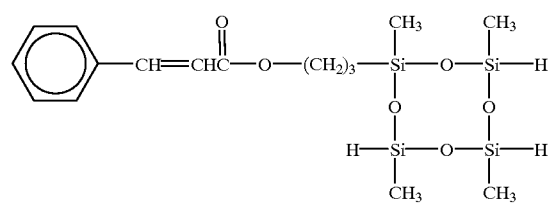 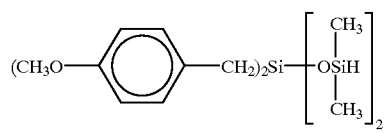
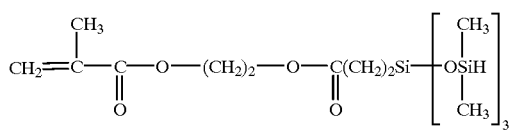 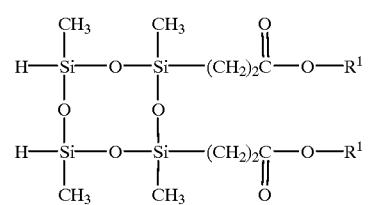
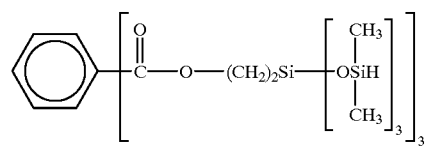 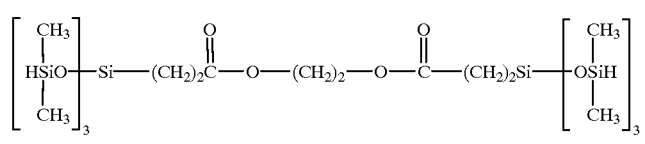

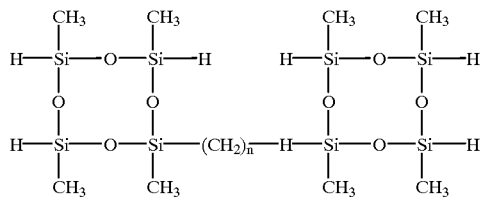

-continued

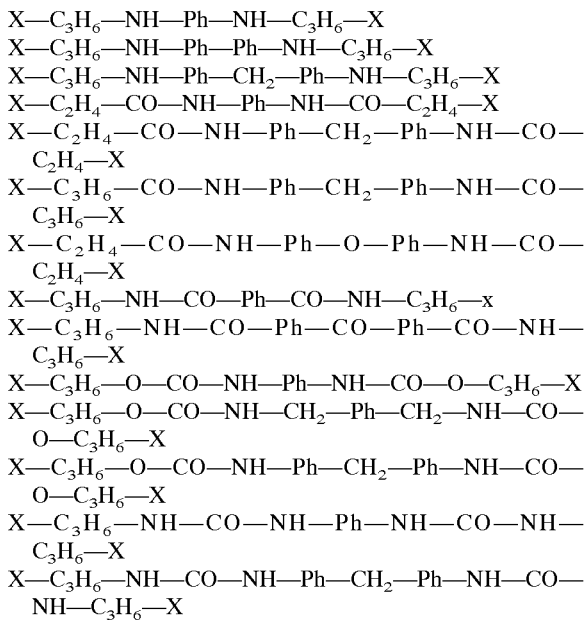

In the formulae, n is 2 to 30, and $R^1$ is as previously defined.

As the adhesive agent compounds having amino and amide groups, art-recognized compounds are useful. Other useful compounds are exemplified below.

X—$C_3H_6$—NH—Ph—NH—$C_3H_6$—X
X—$C_3H_6$—NH—Ph—Ph—NH—$C_3H_6$—X
X—$C_3H_6$—NH—Ph—$CH_2$—Ph—NH—$C_3H_6$—X
X—$C_2H_4$—CO—NH—Ph—NH—CO—$C_2H_4$—X
X—$C_2H_4$—CO—NH—Ph—$CH_2$—Ph—NH—CO—$C_2H_4$—X
X—$C_3H_6$—CO—NH—Ph—$CH_2$—Ph—NH—CO—$C_3H_6$—X
X—$C_2H_4$—CO—NH—Ph—O—Ph—NH—CO—$C_2H_4$—X
X—$C_3H_6$—NH—CO—Ph—CO—NH—$C_3H_6$—x
X—$C_3H_6$—NH—CO—Ph—CO—Ph—CO—NH—$C_3H_6$—X
X—$C_3H_6$—O—CO—NH—Ph—NH—CO—O—$C_3H_6$—X
X—$C_3H_6$—O—CO—NH—$CH_2$—Ph—$CH_2$—NH—CO—O—$C_3H_6$—X
X—$C_3H_6$—O—CO—NH—Ph—$CH_2$—Ph—NH—CO—O—$C_3H_6$—X
X—$C_3H_6$—NH—CO—NH—Ph—NH—CO—NH—$C_3H_6$—X
X—$C_3H_6$—NH—CO—NH—Ph—$CH_2$—Ph—NH—CO—NH—$C_3H_6$—X

Note that X is 1,3,5,7-tetramethyl-3,5,7-trihydrocyclotetrasiloxane, and Ph is phenyl or phenylene.

An appropriate amount of the adhesive agent (E) used is usually up to 10 parts by weight (i.e., 0 to 10 parts by weight), preferably 0.1 to 10 parts, more preferably 0.5 to 5 parts by weight per 100 parts by weight of component (A).

Other Components

In addition to the above-described components, there may be added reinforcing inorganic fillers such as fumed silica, precipitated silica, and fumed titanium dioxide; reinforcing silicone resins; and non-reinforcing inorganic fillers such as calcium silicate, titanium dioxide, ferric oxide, and carbon black. These inorganic fillers are generally used in amounts of 0 to 200 parts by weight, preferably 0.1 to 100 parts by weight per 100 parts by weight of all the components excluding the inorganic fillers.

The silicone rubber composition of the invention is prepared by mixing a portion of component (A) with component (B) and heating the mixture for surface treating component (B) with component (A), adding the remainder of component (A) and an optional inorganic filler to the mixture, and milling the mixture to form a silicone rubber base compound. Alternatively, a silicone rubber base compound is obtained by adding the entirety of component (A), component (B) and an optional inorganic filler, mixing them, and heat treating the mixture for surface treating component (B) with component (A). Then components (C) and (D) and optional component (E) are added to the silicone rubber base compound, followed by milling, resulting in a one part type silicone rubber composition. Alternatively, the silicone rubber composition may be prepared as two part type consisting of the silicone rubber base compound and a blend obtained by separately milling components (C) and (D) and optional component (E), the two parts being admixed on use.

Preferably the silicone rubber composition of the invention is liquid and has a viscosity of about 1 to 1,000 Pa·sec (about 1,000 to 1,000,000 centipoise) at 25° C., and especially about 5 to 300 Pa·sec at 25° C. The silicone rubber composition obtained by the above method exhibits a smooth flow.

Curing conditions may be the same as used in prior art addition reaction curing type silicone rubber compositions. The inventive composition satisfactorily cures even at room temperature, for example. If desired, the composition is heated at about 40 to 200° C., and especially about 60 to 180° C.

The inventive silicone rubber composition cures into a product or silicone rubber having improved heat resistance and electrical insulation.

It has also been found that when the addition reaction curing type silicone rubber composition of the invention is used for providing a seal around an electric or electronic part, the cured composition is effective for protecting the electric or electronic part from corrosion by air-borne corrosive gases. Then the inventive composition is quite effective as a means for solving the corrosion problem with NOx and SOx of electric and electronic parts in vehicle-mounted electrical equipment (including air flow sensors, pressure sensors, slot control modules, crank angle sensors, knocking sensors, temperature sensors, oxygen sensors, NOx sensors, acceleration sensors, engine control circuits, and discharge lamp control circuits).

EXAMPLE

Examples of the invention are given below by way of illustration and not by way of limitation.

Examples & Comparative Examples

Silicone rubber compositions as shown in Tables 1 and 2 were prepared using the following ingredients.

(a) Diorganopolysiloxane

Vinyl group-containing linear dimethylpolysiloxane of the formula:

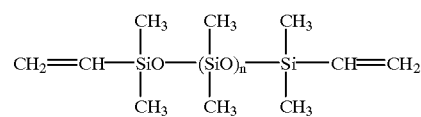

wherein n is such a number that the diorganopolysiloxane has a viscosity of 10,000 cSt at 25° C.

(b) Powder
(b-1) untreated calcium carbonate (Whiten SSB by Shiraishi Industry Co., Ltd., average particle size about 1.5 mn)
(b-2) resin acid-treated calcium carbonate (MT-100 by Maruo Calcium Co., Ltd., average particle size about 2 μm)
(b-3) untreated magnesium carbonate
(c) Platinum-divinyltetramethyldisiloxane complex/toluene solution (platinum element content 0.5 wt %)
(d) Organohydrogenpolysiloxane

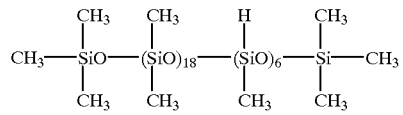

(e) Curing regulator (50% toluene solution of ethynyl cyclohexanol)
(f) Adhesive agent

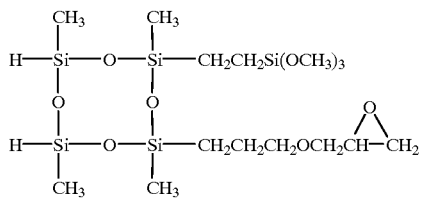

(g) Fumed silica (Degussa R8200)

The above ingredients were milled in a 3-liter Sinagawa universal mixer which could be heated in vacuum. First, ingredients (a), (b) and (g) were mixed and heat treated for 2 hours under the conditions shown in Table 1. After cooling, ingredients (c), (d), (e) and (f) were added to the mixture, which was further mixed (Examples 1–7). Compositions of Comparative Examples were prepared as in Examples except that ingredients (a), (b) and (g) were mixed without heating, that is, at 30° C. in Comparative Examples 1–4; and ingredient (b) was omitted from the mixing/heating step in Comparative Examples 5.

For the evaluation of storage stability, the composition was placed in a 500-ml metal container, which was sealed and held for 24 hours at 40° C. Then an internal pressure within the container was inspected.

For the evaluation of cure and adhesion, the composition was cured to a metal or resin at 120° C. for one hour. The appearance of a cross section of the cured product was observed, and the adhesion of the cured product to the metal or resin was examined. The rating was "Bond" when a firm bond was ascertained and "Strip" when the cured product was stripped from the metal or resin. The metal was aluminum and the resins were polybutylene terephthalate (PBT) and polyphenylene sulfide (PPS).

The results are shown in Tables 1 and 2.

TABLE 1

| Ingredients (pbw) | Example | | | | | | |
|---|---|---|---|---|---|---|---|
| | 1 | 2 | 3 | 4 | 5 | 6 | 7 |
| a | 500 | 500 | 500 | 500 | 500 | 500 | 500 |
| b-1 | 200 | 200 | 200 | 200 | 200 | | |
| b-2 | | | | | | 200 | |
| b-3 | | | | | | | 200 |
| g | 5 | 5 | 5 | 5 | | 5 | 5 |

TABLE 1-continued

| Ingredients (pbw) | Example | | | | | | |
|---|---|---|---|---|---|---|---|
| | 1 | 2 | 3 | 4 | 5 | 6 | 7 |
| Treatment | | | | | | | |
| Temperature (° C.) | 80 | 100 | 150 | 100 | 100 | 150 | 100 |
| Pressure (mmHg) | 760 | 760 | 760 | 200 | 760 | 200 | 200 |
| c | 0.1 | 0.1 | 0.1 | 0.1 | 0.1 | 0.1 | 0.1 |
| e | 0.3 | 0.3 | 0.3 | 0.3 | 0.3 | 0.3 | 0.3 |
| d | 2 | 2 | 2 | 2 | 2 | 2 | 2 |
| f | 3 | 3 | 3 | 3 | 3 | 3 | 3 |
| Viscosity (Pa · sec) | 82 | 76 | 76 | 79 | 55 | 96 | 72 |
| Hardness (Durometer A) | 29 | 34 | 35 | 34 | 28 | 33 | 36 |
| Storage stability (gas evolution) | No | No | No | No | No | Some | No |
| Cured appearance (foam) | No | No | No | No | No | Some | No |
| Adhesive | | | | | | | |
| Aluminum | Bond | Bond | Bond | Bond | Bond | Bond | Bond |
| PBT | Bond | Bond | Bond | Bond | Bond | Bond | Bond |
| PPS | Bond | Bond | Bond | Bond | Bond | Strip | Bond |

TABLE 2

| Ingredients (pbw) | Comparative Example | | | | |
|---|---|---|---|---|---|
| | 1 | 2 | 3 | 4 | 5 |
| a | 500 | 500 | 500 | 500 | 500 |
| b-1 | | 200 | | 200 | |
| b-2 | | | | | |
| b-3 | | | | | |
| g | 5 | 5 | | | 5 |
| Treatment | | | | | |
| Temperature (° C.) | 30 | 30 | 30 | 30 | 100 |
| Pressure (mmHg) | 760 | 760 | 760 | 760 | 760 |
| c | 0.1 | 0.1 | 0.1 | 0.1 | 0.1 |
| e | 0.3 | 0.3 | 0.3 | 0.3 | 0.3 |
| d | 2 | 2 | 2 | 2 | 2 |
| f | 3 | 3 | 3 | 3 | 3 |
| Viscosity (Pa · sec) | 62 | 83 | 42 | 59 | 60 |
| Hardness (Durometer A) | 35 | 26 | 29 | 18 | 35 |
| Storage stability (gas evolution) | No | Found | No | Found | No |
| Cured appearance (foam) | No | Found | No | Found | No |
| Adhesive | | | | | |
| Aluminum | Bond | Bond | Bond | Bond | Bond |
| PBT | Bond | Bond | Bond | Bond | Bond |
| PPS | Strip | Bond | Strip | Bond | Strip |

As seen from Tables 1 and 2, the compositions (Examples 1–5) within the scope of the invention are improved in adhesion to metal and resin, storage stability and cured appearance, due to the addition of calcium carbonate. The composition of Example 6 exhibits satisfactory adhesion, but somewhat unfavorable in storage stability and cured appearance, indicating that resin acid-treated calcium carbonate is less preferable. Examples 1–5 and 7 using initially untreated calcium carbonate or magnesium carbonate exhibit satisfactory rubber characteristics, attaining the intended purposes.

Additionally, the compositions of Example 3 and Comparative Example 5 were examined for an ability as a sealant to protect electric or electronic parts from corrosive gases. Examination was made by two test procedures under the conditions described below.

Test Procedures:

(1) The composition was directly applied onto a B type comb-shaped electrode, and heat cured at 120° C. for one hour.

(2) An electrode was placed in a case consisting of a glass casing and a glass lid. The composition was applied as a bonding seal between the casing and the lid and heat cured at 120° C. for one hour.

Test atmosphere: a mixture of air with 30 ppm of $NO_2$ gas and 30 ppm of $SO_2$ gas
Test temperature: 23° C.
Time: 500 hours
Electrode: JIS B type comb-shaped electrodes of copper and aluminum
Applied voltage: DC 12 volts The degree of corrosion was examined by scraping off the sealant to expose the electrode surface at the end of the test and observing whether or not the appearance of the electrode surface changed.

The results are shown in Table 3.

TABLE 3

| Composition | Example 3 | | | | Comparative Example 5 | | | |
|---|---|---|---|---|---|---|---|---|
| Electrode | Copper | | Aluminum | | Copper | | Aluminum | |
| Sealing procedure | (1) | (2) | (1) | (2) | (1) | (2) | (1) | (2) |
| Evaluation | | | | | | | | |
| 0 hr | OK | OK | OK | OK | OK | OK | OK | OK |
| 100 hr | OK | OK | OK | OK | OK | OK | Corroded | OK |
| 200 hr | OK | OK | OK | OK | OK | OK | Corroded | Corroded |
| 300 hr | OK | OK | OK | OK | Corroded | OK | Corroded | Corroded |
| 400 hr | OK | OK | OK | OK | Corroded | Corroded | Corroded | Corroded |
| 500 hr | OK | OK | OK | OK | Corroded | Corroded | Corroded | Corroded |

There has been described an addition reaction curing type silicone rubber composition loaded with alkaline earth metal carbonate powder, which composition has improved storage stability in that it gives off a minimized amount of hydrogen gas during storage. The composition has improved adhesion and a good ability to protect electric or electronic parts from corrosion and finds use in a variety of applications, typically in the sealing of electric or electronic parts.

Japanese Patent Application No. 2000-219502 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An addition reaction curing type silicone rubber composition comprising:
   (A) a diorganopolysiloxane containing at least two alkenyl groups in a molecule,
   (B) an alkaline earth metal carbonate powder having an average particle size of 0.05 to 50 μm which is surface treated substantially with a diorganopolysiloxane,
   (C) an organohydrogenpolysiloxane containing at least two hydrogen atoms each attached to a silicon atom in a molecule, and
   (D) a platinum group metal catalyst.

2. The silicone rubber composition of claim 1 wherein the alkaline earth metal carbonate powder surface treated substantially with a diorganopolysiloxane (B) is obtained by mixing a starting alkaline earth metal carbonate powder with a diorganopolysiloxane at an elevated temperature.

3. The silicone rubber composition of claim 2 wherein the starting alkaline earth metal carbonate powder is a calcium carbonate powder.

4. The silicone rubber composition of claim 3 wherein the starting calcium carbonate powder has not been treated on particle surfaces.

5. The silicone rubber composition of claim 1, further comprising (E) an adhesive agent having a functional group selected from the group consisting of epoxy, alkoxysilyl, carbonyl and phenyl groups.

6. The silicone rubber composition of claim 5, wherein the adhesive agent imparts adhesiveness of said silicone rubber composition so that said silicone rubber composition can adhere to metals and/or organic resins.

7. The silicone rubber composition of claim 1 which is of one part type.

8. Electric equipment sealed to a vehicle with a sealant, said sealant comprising the silicone rubber composition of claim 1.

9. A method for preparing an addition reaction curing type silicone rubber composition, comprising the steps of:
   mixing a portion or all of a diorganopolysiloxane containing at least two alkenyl groups in a molecule with an alkaline earth metal carbonate having an average particle size of 0.05 to 50 μm at an elevated temperature for surface treating the alkaline earth metal carbonate,
   mixing the mixture with the remainder of the diorganopolysiloxane if the portion thereof is used in the first mixing step, and
   mixing the mixture with an organohydrogenpolysiloxane containing at least two hydrogen atoms each attached to a silicon atom in a molecule and a platinum group metal catalyst.

10. Electric equipment sealed to a vehicle with a sealant, said sealant comprising comprises an addition reaction curing type silicone rubber composition, said silicone rubber composition comprising:
   (A) a diorganopolysiloxane containing at least two alkenyl groups in a molecule,
   (B) an alkaline earth metal carbonate powder surface treated substantially with a diorganopolysiloxane,
   (C) an organohydrogenpolysiloxane containing at least two hydrogen atoms each attached to a silicon atom in a molecule, and
   (D) a platinum group metal catalyst.

11. The electric equipment of claim 10, wherein the alkaline earth metal carbonate powder surface treated substantially with a diorganopolysiloxane (B) of said silicone rubber composition is obtained by mixing a starting alkaline earth metal carbonate powder with a diorganopolysiloxane at an elevated temperature.

12. The electric equipment of claim 11, wherein the starting alkaline earth metal carbonate powder of said silicone rubber composition is a calcium carbonate powder.

13. The electric equipment of claim 12, wherein the starting calcium carbonate powder of said silicone rubber composition has not been treated on particle surfaces.

14. The electric equipment of claim 12, wherein the calcium carbonate powder of said silicone rubber composition has an average particle size of 0.05 to 50 $\mu$m.

15. The electric equipment of claim 10, wherein said silicone rubber composition further comprises (E) an adhesive agent having a functional group selected from the group consisting of epoxy, alkoxysilyl, carbonyl and phenyl groups.

16. The electric equipment of claim 15, wherein the adhesive agent imparts adhesiveness of said silicone rubber composition so that said silicone rubber composition can adhere to metals and/or organic resins.

17. The electric equipment of claim 10, wherein said silicone rubber composition is of one part type.

* * * * *

UNITED STATES PATENT AND TRADEMARK OFFICE
CERTIFICATE OF CORRECTION

PATENT NO. : 6,613,440 B2 Page 1 of 1
DATED : September 2, 2003
INVENTOR(S) : Hiroyasu Hara et al.

It is certified that error appears in the above-identified patent and that said Letters Patent is hereby corrected as shown below:

<u>Title page,</u>
Item [73], please correct to read as follows:
-- [73]   Assignee:  Shin-Etsu Chemical Co., Ltd.
                    Tokyo (JP) --

Signed and Sealed this

Fourth Day of May, 2004

JON W. DUDAS
*Acting Director of the United States Patent and Trademark Office*